United States Patent [19]

Borlinghaus et al.

[11] Patent Number: 5,087,009
[45] Date of Patent: Feb. 11, 1992

[54] POWER SEAT ADJUSTER WITH INTEGRAL HORIZONTAL INTERLOCK SYSTEM

[75] Inventors: Hans J. Borlinghaus, Mt. Clemens; James H. Klein, Rochester, both of Mich.

[73] Assignee: General Motors Corporation, Detroit, Mich.

[21] Appl. No.: 618,803

[22] Filed: Nov. 28, 1990

[51] Int. Cl.⁵ ............................................. F16M 13/00
[52] U.S. Cl. ........................................................ 248/429
[58] Field of Search .............. 248/429, 430, 419, 420, 248/668; 297/468, 469, 473, 480, 216

[56] References Cited

U.S. PATENT DOCUMENTS

| | | | |
|---|---|---|---|
| 3,204,916 | 9/1965 | Pickles | 248/429 |
| 4,482,188 | 11/1984 | Tilly | 297/468 |
| 4,488,754 | 12/1984 | Heesch et al. | 297/216 |
| 4,664,351 | 5/1987 | Borlinghaus | 248/422 |
| 4,664,442 | 5/1987 | Stolper | 297/480 |
| 4,676,556 | 6/1987 | Yamanoi et al. | 297/473 |
| 4,729,602 | 3/1988 | Tokugawa | 297/468 |
| 4,790,597 | 12/1988 | Bauer et al. | 297/468 |
| 4,832,409 | 5/1989 | Borlinghaus | 297/468 |
| 4,881,781 | 11/1989 | Borlinghaus | 297/473 |
| 4,964,608 | 10/1990 | Rogala | 248/429 |

FOREIGN PATENT DOCUMENTS

| | | | |
|---|---|---|---|
| 2027884 | 11/1978 | Fed. Rep. of Germany | 297/480 |
| 2820589 | 11/1979 | Fed. Rep. of Germany | 297/473 |
| 2826634 | 1/1980 | Fed. Rep. of Germany | 297/473 |
| 3614457 | 11/1987 | Fed. Rep. of Germany | 297/473 |
| 18348 | 1/1987 | Japan | 297/473 |
| 2183988 | 6/1987 | United Kingdom | 297/473 |

*Primary Examiner*—Ramon O. Ramirez
*Assistant Examiner*—Robert A. Olson
*Attorney, Agent, or Firm*—Edward J. Biskup

[57] ABSTRACT

A six way power seat adjuster assembly has a lock arm that in conjunction with a lower channel provides horizontal as well as vertical restraint for an occupant of a vehicle. The lock arm is slid into engagement with the lower channel by application of a force on an occupant restraint belt system with the result that the seat adjuster assembly transfers the force from the occupant restraint belt system to the vehicle body.

9 Claims, 3 Drawing Sheets

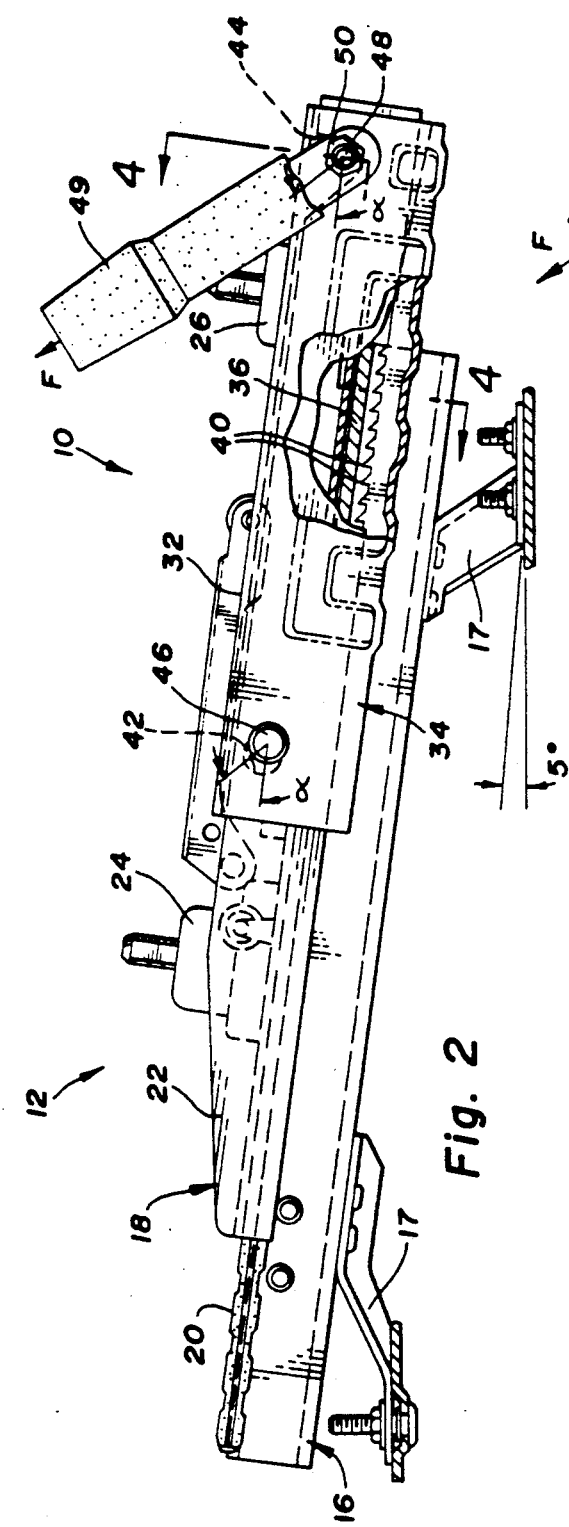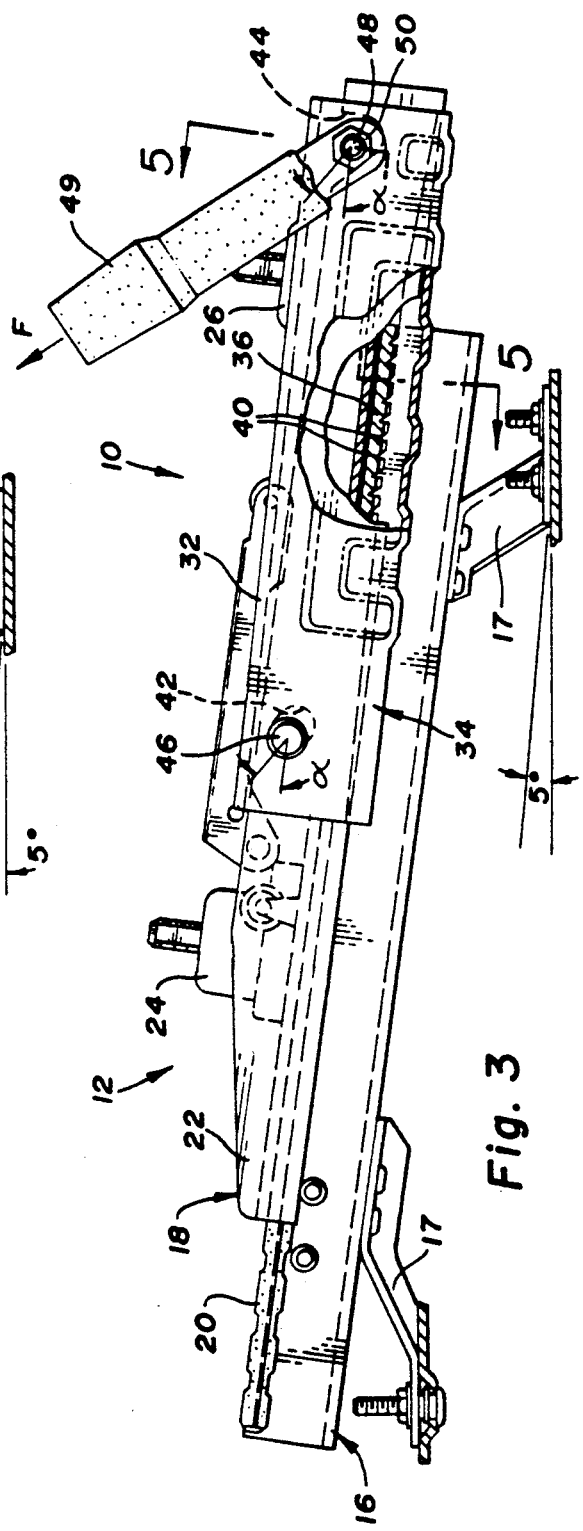

POWER SEAT ADJUSTER WITH INTEGRAL HORIZONTAL INTERLOCK SYSTEM

BACKGROUND OF THE INVENTION

This invention relates generally to power seat adjusters and more specifically to power seat adjusters with an integral horizontal interlock system.

To maximize vehicle seat occupant comfort, it has been known in the art to provide power seat adjusters capable of adjustment in six directions. Typically the adjusters have a floor or lower channel fixably connected to the vehicle and an upper channel slideably mounted to the lower channel. An excellent example of a six way power seat adjuster can be found in U.S. Pat. No. 4,664,351 issued to Hans Borlinghaus and assigned to General Motors, the disclosure of which is incorporated by reference. Usually, the channels of a power seat adjuster are fabricated from extruded aluminum in an interlocking design. The fore and aft horizontal actuator of the seat adjuster is designed to withstand the normal loading imposed upon the seat due to sudden decelerations of the vehicle. However, the seat adjuster normally is not designed to withstand the loading of an occupant restraint belt system which can commonly be in the range of 6000 pounds of force. Therefore, the occupant restraint belt system is usually anchored directly to the vehicle floor.

When the vehicle seat belt is anchored directly to the vehicle floor, movement of the seat by the horizontal actuator can often require readjustment of the seat belt. It is desirable to provide a power seat adjuster and slide wherein the occupant seat restraint belt system may be anchored to the seat adjuster directly thereby deleting the requirement of the vehicle seat occupant having to adjust his vehicle seat restraint belt system every time he utilizes the seat adjuster. Examples of this can be found in U.S. Pat. No. 4,832,409 and U.S. Pat. No. 4,881,781 both issued to Hans Borlinghaus and commonly assigned to General Motors, the disclosures of which are incorporated by reference. These devices, though, have the difficulty of being complicated and expensive to manufacture.

Another example of the above described type of system can be found in U.S. Pat. No. 4,729,602 issued to Osamu Tokugawa. The Tokugawa device has the normal interlocking channels for normal fore and aft movement of the seat assembly. This device also has a occupant restraint belt system which is attached to a base plate. An anchor stay is fixedly attached to the body of the vehicle. A portion of the anchor stay contains a plurality of teeth, which in turn are covered by a resin cover. The base plate is positioned so that if a vertical force is applied to the occupant restraint belt system, the base plate will engage the teeth of the anchor stay. A pair of rivets hold the base plate in position so that the base plate does not engage the anchor stay prematurely.

One problem with the Tokugawa device is that it needs a vertical force to make it work properly. If the force of the occupant restraint belt system has no vertical component, or if the vertical component of the force is too small, the base plate will not engage the teeth of the anchor stay. For most sudden deceleration situations this will not be a problem. But some sudden deceleration situations could involve most of the force being directed in a horizontal direction, and the occupant restraint belt system may not have the necessary vertical force. Also, this device does not lock up immediately, but the base plate must travel to the next gap in the teeth of the anchor stay, adding to the time before the interlocking occurs. This design also necessitates adding extra pieces to the seat assembly, which adds cost and manufacturing difficulty.

SUMMARY OF THE INVENTION

An object of the present invention is to provide a new and improved power seat adjuster with an integral horizontal interlock system that is simple and easy to manufacture.

Another object of the present invention is to provide a new and improved power seat adjuster with an integral horizontal interlock system that will provide interlocking when the seat is in any horizontal position when forces are applied to the seat in a horizontal or in a vertical direction with one system.

Yet another object of the present invention is to provide a new and improved power seat adjuster with an integral horizontal interlock system that requires very little travel of the seat before it is secured.

Still another object of the present invention is to provide a new and improved power seat adjuster with an integral horizontal interlock system that will provide locking of the seat when the force on the seat is in a vertical or a horizontal direction.

The present invention meets the above described objects by providing a new and improved power seat adjuster with an integral horizontal interlock system. The seat adjuster comprises a lower channel fixedly attached to the vehicle, with the lower channel having a flange portion. An upper channel is fixedly attached to the seat and is slidably carried by the lower channel. A lock arm is connected to an occupant restraint belt system. More specifically, the lock arm is slidably carried by the upper channel through a pair of pin and slot connections in a manner such that a horizontal or vertical force on the lock arm from the occupant restraint belt system will produce a motion of the lock arm relative to the upper channel that has a vertical component for interlocking the lock arm with the lower channel. In this regard, the lock arm has a flange portion which has teeth constructed from material which is harder than the material of the flange portion of the lower channel. The teeth are positioned below the aforementioned lower channel flange portion so that when the occupant restraint belt system produces the aforementioned motion of the lock arm relative to the upper channel that has a vertical component, the teeth engage and dig into the lower channel flange portion resulting in the lock arm being fixedly attached in interlocking engagement with the lower channel and no vertical or horizontal movement can occur relative to one another. In order to maintain the teeth spaced from the lower channel during normal operating conditions of the seat adjuster, a spring element is interposed between the upper channel and the lock arm. The spring element exerts a spring force so that the teeth of the lock arm and the flange portion of the lower channel do not engage each other until the force on the lock arm from the occupant restraint belt system exceeds the spring force.

Other objects and features of the invention will become apparent to those skilled in the art as disclosure is made in the following detailed description of a preferred embodiment of the invention which sets forth the best mode of the invention contemplated by the inven-

BRIEF DESCRIPTION OF THE DRAWINGS

FIG. 2 is a side view of the power seat adjuster with an integral horizontal interlock system as seen in FIG. 1 with the interlock system of the present invention under normal conditions showing the lower channel and the lock arm disengaged;

FIG. 3 is a side view of the power seat adjuster with an integral horizontal interlock system similar to that seen in FIG. 2 but with the interlock system of the present invention under loading conditions showing the lower channel and the lock arm engaged;

DETAILED DESCRIPTION OF THE PREFERRED EMBODIMENTS

Figure 1:
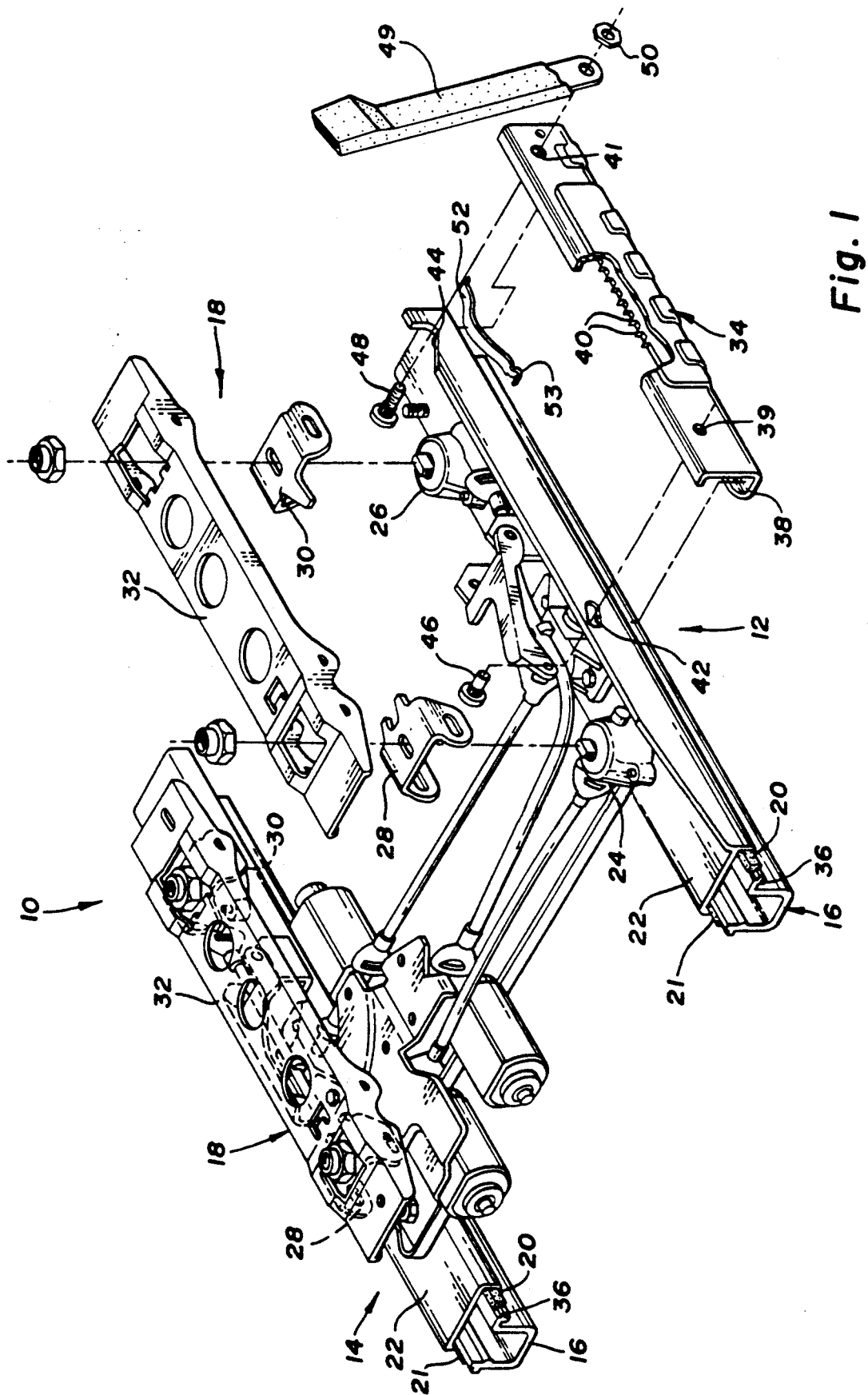
FIG. 1 is an exploded perspective view of the power seat adjuster with an integral horizontal interlock system made in accordance with the present invention.
Figure 4:
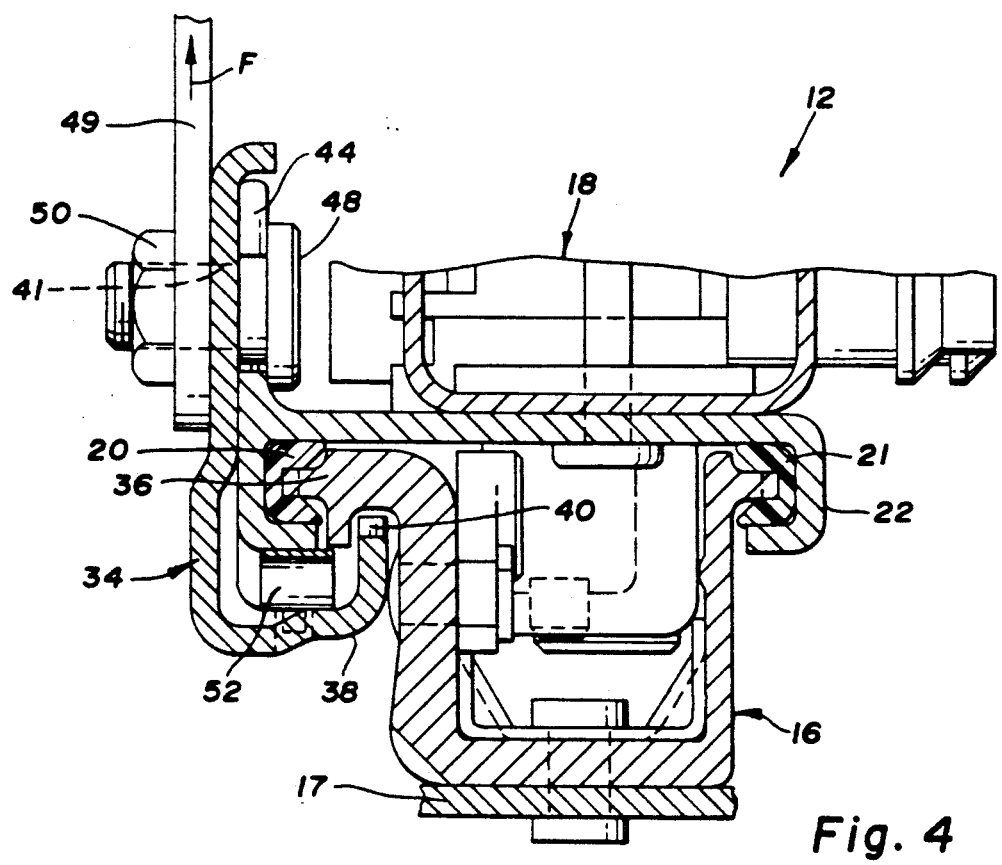
FIG. 4 is an enlarged sectional end view taken along line 4—4 of FIG. 2.
Figure 5:
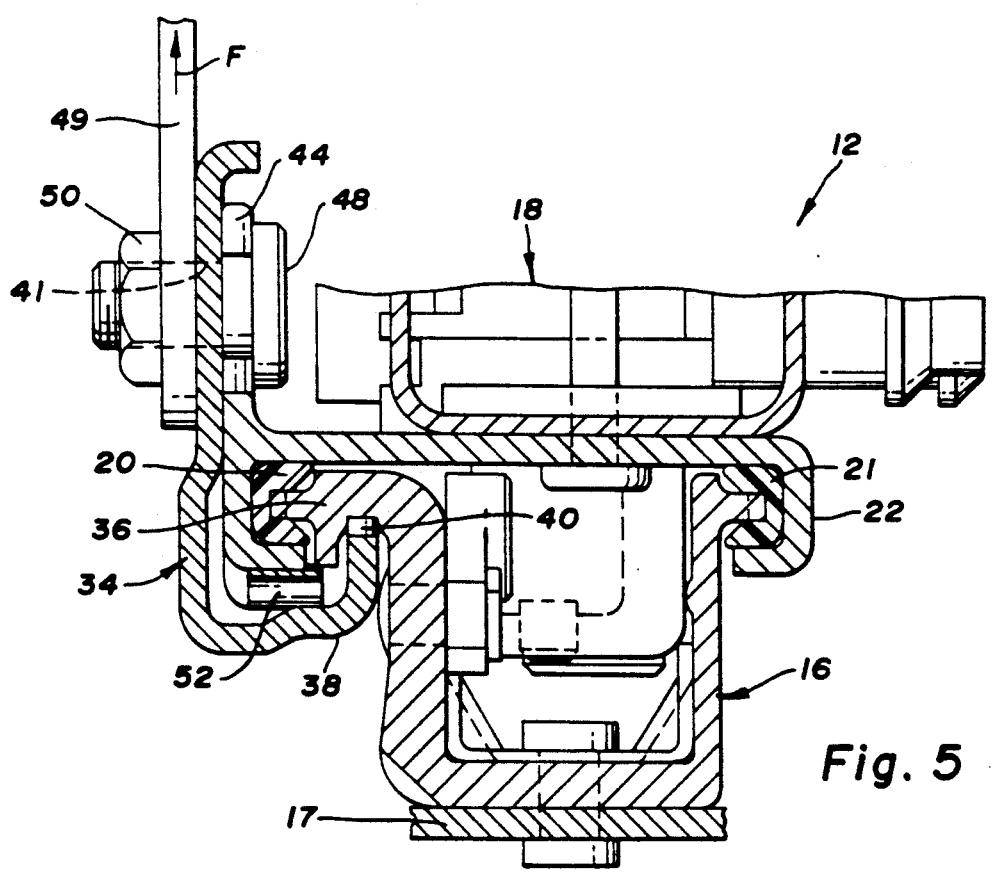
FIG. 5 is an enlarged sectional end view taken along line 5—5 of FIG. 3.

Referring to FIG. 1, a six way power seat adjuster 10 with an integral horizontal interlock system made in accordance with the present invention is shown. The six way power seat adjuster 10 has two slider assemblies 12 and 14 mounted in a parallel fore and aft fashion in the vehicle. Each slider assembly 12 and 14 comprises an elongated lower channel 16, also known as a floor plate or a floor channel, constructed of aluminum and fixably connected by mounting brackets 17 to the vehicle at approximately a 5 degree angle inclined downward toward the rear. An upper channel assembly 18, also known as a seat channel assembly, is slidably mounted on the lower channel 16 by a pair of bearing members 20 and 21 as seen in FIGS. 4 and 5.

The upper channel assembly 18 comprises an upper channel 22, front jack screw 24 and a rear jack screw 26 for selectively adjusting the elevation of the front and rear portions of a seat (not shown), a pair of lift brackets 28 and 30, and a top plate 32 connected to the seat. The upper channel 22 is slidably mounted on the lower channel 16 by the bearing members 20 and 21. The front jack screw 24 and the rear jack screw 26 are fixedly attached to the upper channel 22, and the top plate 32 is fixedly attached to the front jack screw 24 and the rear jack screw 26 by the lift brackets 28 and 30, respectively.

A lock arm 34 constructed of steel is attached for limited sliding and shifting movement to a side of the upper channel 22 of one of the slider assemblies 12 and 14, preferably the slider assembly 12 that is to the interior of the vehicle, though either slider assembly 12 and 14 may be so equipped. The lock arm 34 is connected to the upper channel 22 of the slider assembly 12, as mentioned above, by a rivet 46 and a bolt 48 which pass through holes 39 and 41, respectively, in the lock arm 34. The rivet 46 and the bolt 48 also pass through a hole 42 and a slot 44, respectively, both of which are formed in the upper channel and which serve as ramps. The bolt 48 normally sits in the slot 44, passes though the hole 39 in the lock arm 34 and connects an occupant restraint belt system 49 to the lock arm 34 held in place by a nut 50.

The lower channel 16 has a flange portion 36 into which a flange portion 38 of the lock arm 34 will interlock when the lock arm 34 is slid upward relative to the upper channel 22 of the slider assembly 12. More specifically, the lock arm flange portion 38 of the lock arm 34 has teeth 40 which are positioned so that when the flange portion 38 of the lock arm 34 is forcibly moved upwardly to interlock with the lower channel flange portion 36, the teeth will engage and dig into the lower channel flange portion 36. To permit the teeth 40 to dig into the lower channel flange portion 36, the teeth 40 are constructed from a material which is harder than the material of the lower channel flange portion 36. Preferably the teeth 40 are constructed from steel and the lower channel 16 is constructed from aluminum.

As seen in FIGS. 1 and 4, a spring element 52 is attached to the lock arm flange portion 38 of the lock arm 34. The spring element 52 has a curved, bow-like shape. A forward end of the spring element 52 has a loop 53 which fits into a groove in the lock arm flange portion 38 while a rear end of the spring element 52 slides freely within the flange portion 38. The spring element 52 is interposed between the lock arm 34 and the upper channel 22 to keep the lock arm flange portion 38 spaced away from the lower channel flange portion 36 so as to normally keep the lock arm 34 from interlocking with the lower channel 16, as shown in FIGS. 2 and 4. An example of a typical spring force that would be used is a spring force of 25 pounds.

When a sudden deceleration of the vehicle occurs, the occupant restraint belt system 49 holds the occupant in the seat of the vehicle. This creates a force F on the occupant restraint belt system 49, which is transferred through the bolt 48 to the lock arm 34. If the force F has a vertical component great enough to counteract the spring force of the spring element 52, the lock arm 34 will move upwardly and forwardly relative to the upper channel 22 and the lower channel 16 under the control of the ramp angle of the slot 44 and the hole 42. After a small amount of movement, the teeth 40 engage and dig into the lower channel 16, as shown in FIGS. 3 and 5, since the lock arm 34 and teeth 40 are, as aforementioned, constructed of a harder material such as steel, while the lower channel 16 is constructed of aluminum. This effectively locks the lock arm 34 to the lower channel 16, and allows the force F from the occupant restraint belt system 49 to be transferred to the mounting brackets 17 and then to the vehicle.

Under conditions when there may be little or no vertical component to the force F, but it is entirely or mostly a horizontal force, the lock arm 34 will still cause the teeth 40 to dig into and engage the lower channel 16. In this case the vertical component to counteract the spring element 52 will be provided by the ramp angle of the hole 42 and the ramp angle of the slot 44. As the lock arm 34 is pulled forward by the belt system relative to the upper channel 22, the rivet 46 and the bolt 48 in cooperation with the ramp angle of the hole 42 and the ramp angle of the slot 44 will cause the lock arm 34 move upwardly as well as forwardly. Depending on the angle α for the ramp angle of the hole 42 and the ramp angle of the slot 44, the lock arm 34 will be shifted upwardly to cause the teeth to dig into the flange of the lower channel 16. An example of an angle α for the ramp angle is a 40 degree angle from the longitudinal center axis of the upper channel 22. Since the lower channel 16 and upper channel 22 are mounted at a 5 degree angle relative to the vehicle, that makes a 45 degree angle from the horizontal of the vehicle.

The six way power seat adjuster 10 with an integral horizontal interlock system of the present invention has many advantages over the prior art. One advantage is that it adds very few additional parts to the seat adjuster 10 and is easy to manufacture. Here, the lock arm 34 and lower channel 16 are able to restrain vertical and horizontal movement. Previous seat adjusters had interlocking channels to constrain vertical movement and an additional assembly to constrain horizontal movement. Another advantage is that there is very little travel of the lock arm 34 before the lock arm 34 engages the lower channel 16. The teeth 40 are able to dig into the lower channel 16 as soon as they make contact with the lower channel 16, so there is no need for the lock arm to travel until the teeth 40 can find a place to engage as in the U.S. Pat. No. 4,729,602 issued to Osamu Tokugawa.

We wish it to be understood that we do not desire to be limited to the exact details of construction shown and described, for obvious modifications will occur to a person skilled in the art.

The embodiments of the invention in which an exclusive property or privilege is claimed are defined as follows:

1. A seat adjuster for a vehicle seat adjustable fore and aft with an occupant restraint belt system connected to the seat adjuster, the seat adjuster in combination comprising:
   a lower channel fixedly attached to the vehicle;
   the lower channel having a lower channel flange portion;
   an upper channel fixedly supporting the vehicle seat;
   the upper channel slidably carried by the lower channel;
   a lock arm connected at one end to the occupant restraint belt system;
   the lock arm slidably connected to the upper channel such that a force on the lock arm from the occupant restraint belt system will produce a motion of the lock arm relative to the upper channel that has a vertical component;
   the lock arm having a lock arm flange portion;
   the lock arm flange portion of the lock arm having teeth;
   the teeth being constructed from a material which is harder than the material of the lower channel flange portion of the lower channel;
   the teeth being positioned adjacent the lower flange so that when the occupant restraint belt system produces the aforementioned motion of the lock arm the teeth of the lock arm flange portion will engage and dig into the lower channel flange portion so that the lock arm is fixedly attached to the lower channel and no vertical or horizontal movement can occur relative to one another; and
   a spring element interposed between the upper channel and the lock arm which exerts a spring force so that the teeth of the lock arm flange portion of the lock arm and the lower channel flange portion of the lower channel do not engage each other until the force on the lock arm from the occupant restraint belt system exceeds the spring force.

2. The seat adjuster for a vehicle seat adjustable fore and aft with an occupant restraint belt system connected to the seat adjuster as in claim 1, wherein the force on the lock arm from the occupant restraint belt system has a horizontal component.

3. The seat adjuster for a vehicle seat adjustable fore and aft with an occupant restraint belt system connected to the seat adjuster as in claim 1 wherein the force on the lock arm from the occupant restraint belt system has a vertical component.

4. A seat adjuster for a vehicle seat adjustable fore and aft with an occupant restraint bet system connected to the seat adjuster, the seat adjuster in combination comprising:
   a lower channel fixedly attached to the vehicle;
   the lower channel having a lower channel flange portion;
   an upper channel fixedly supporting the vehicle seat;
   the upper channel slidably carried by the lower channel;
   the upper channel defining a hole and a slot which form a ramp angle;
   a lock arm connected at one end to the occupant restraint belt system;
   the lock arm slidably connected to the upper channel by connecting means through the hole and the slot such that a force on the lock arm from the occupant restraint belt system will produce a motion of the lock arm relative to the upper channel that has a vertical component;
   the lock arm having a lock arm flange portion;
   the lock arm flange portion of the lock arm having teeth;
   the teeth being constructed from a material which is harder than the material of the lower channel flange portion of the lower channel;
   the teeth being positioned adjacent the lower flange so that when the occupant restraint belt system produces the aforementioned motion of the lock arm the teeth of the lock arm flange portion will engage and dig into the lower channel flange portion so that the lock arm is fixedly attached to the lower channel and not vertical or horizontal movement can occur relative to one another; and
   said ramp angle of the hole and slot being inclined forwardly so that upon application of the force in the lock arm, the lock arm moves bodily forward relative to the upper channel and causes corresponding movement of the teeth to engage and dig into the lower channel.

5. The seat adjuster for a vehicle seat adjustable fore and aft with an occupant restraint belt system connected to the seat adjuster as in claim 4 wherein the force on the lock arm from the occupant restraint belt system has a horizontal component.

6. The seat adjuster for a vehicle seat adjustable fore and aft with an occupant restraint belt system connected to the seat adjuster as in claim 4 wherein the force on the lock arm from the occupant restraint belt system has a vertical component.

7. A seat adjuster for a vehicle seat adjustable fore and aft with an occupant restraint belt system connected to the seat adjuster, the seat adjuster in combination comprising:
   a lower channel fixedly attached to the vehicle;
   the lower channel having a lower channel flange portion;
   an upper channel fixedly supporting the vehicle seat;
   the upper channel slidably carried by the lower channel;
   the upper channel defining a hole and a slot which form a ramp angle;
   a lock arm connected at one end to the occupant restraint belt system;

the lock arm slidably connected to the upper channel by connecting means through the hole and the slot such that a force on the lock arm from the occupant restraint belt system will produce a motion of the lock arm relative to the upper channel that has a vertical component;

the lock arm having a lock arm flange portion;

the lock arm flange portion of the lock arm having teeth;

the teeth being constructed from a material which is harder than the material of the lower channel flange portion of the lower channel;

the teeth being positioned adjacent the lower flange so that when the occupant restraint belt system produces the aforementioned motion of the lock arm the teeth of the lock arm flange portion will engage and dig into the lower channel flange portion so that the lock arm is fixedly attached to the lower channel and no vertical or horizontal movement can occur relative to one another; and a spring element interposed between the upper channel and the lock arm which exerts a spring force so that the teeth of the lock arm flange portion of the lock arm and the lower channel flange portion of the lower channel do not engage each other until the force on the lock arm from the occupant restraint belt system exceeds the spring force.

8. The seat adjuster for a vehicle seat adjustable fore and aft with an occupant restraint belt system connected to the seat adjuster as in claim 7 wherein the force on the lock arm from the occupant restraint belt system has a horizontal component.

9. The seat adjuster for a vehicle seat adjustable fore and aft with an occupant restraint belt system connected to the seat adjuster as in claim 7 wherein the force on the lock arm from the occupant restraint belt system has a vertical component.

* * * * *